United States Patent [19]
De Regnaucourt

[11] 3,811,736
[45] May 21, 1974

[54] TORQUE TRANSMITTING MEANS FOR A DUAL RIM, SPACER AND WHEEL ASSEMBLY

[75] Inventor: Robert A. De Regnaucourt, Centerville, Ohio

[73] Assignee: The Dayton Steel Foundry Company, Dayton, Ohio

[22] Filed: July 25, 1972

[21] Appl. No.: 274,998

[52] U.S. Cl............ 301/13 R, 301/10 C, 301/11 R
[51] Int. Cl............................................. B60b 23/00
[58] Field of Search .......... 301/10 DC, 12 R, 38 R, 301/12 M, 13 R, 135 M

[56] References Cited
UNITED STATES PATENTS
2,884,280   4/1959   Atkin .......................... 301/13 SM
3,068,049   12/1962  Smith ............................. 301/38 R FOREIGN PATENTS OR APPLICATIONS
1,095,210   12/1954  France ............................ 301/13 R
337,432    3/1936   Italy ............................. 301/13 SM
756,934    10/1933  France .......................... 301/13 SM Primary Examiner—Richard J. Johnson
Assistant Examiner—Reinhard J. Eisenzopf
Attorney, Agent, or Firm—Mack D. Cook, II

[57] ABSTRACT

A dual rim, spacer and wheel assembly including as clamping elements a series of axially inner clamp means and a series of axially outer clamp lugs to cooperatively engage the mounting flanges of dual rims separated by the spacer. Each set of a clamp means and a clamp lug are supported by a fastening element extending axially through the wheel. The fastening elements carry fastening means which draw the clamp means and the clamp lugs together to seat the rim flanges. The assembly also has a torque transmitting means providing a positive driving connection between the inner rim-spacer-outer rim mounted on the wheel by the clamping elements.

8 Claims, 8 Drawing Figures

3,811,736

TORQUE TRANSMITTING MEANS FOR A DUAL RIM, SPACER AND WHEEL ASSEMBLY

CROSS-REFERENCE TO RELATED APPLICATIONS

The use as clamping elements of sets of axially inner clamp means and axially outer clamp lugs supported by fastening means extending axially through the wheel and carrying fastening means thereon, is the subject matter of co-pending application Ser. No. 252,412, filed May 11, 1972. The spacer, except as modified according to the invention, is the subject matter of co-pending application Ser. No. 252,413, filed May 11, 1972.

BACKGROUND OF THE INVENTION

The invention relates to a dual rim, spacer and wheel assembly. More particularly, the invention relates to a dual rim, spacer and wheel assembly as disclosed in co-pending applications Ser. No. 252,412 and Ser. No. 252,413, both filed May 11, 1972. These assemblies are for dual tire carrying rims on a wheel, such as the rear wheel, of a motor vehicle, such as a truck.

The clamping elements of co-pending application Ser. No. 252,412, will assure lateral alignment and minimize radial runout of the rims when mounted on a wheel. The spacer of co-pending application Ser. No. 252,413, is positioned or positively located on the wheel felloe so that the clamping elements cannot be torqued or over-tightened so as to distort lateral alignment or contribute to radial runout of the rims when mounted on a wheel. It has now been found possible to provide an assembly with torque transmitting means providing a positive, or non-slip, driving connection between the inner rim-spacer-outer rim.

The prior art had positively driven rim and wheel assemblies, for both single and dual rim mountings. U.S. Pat. No. 3,039,824 patented June/1962 to the Dayton Steel Foundry Company and U.S. Pat. No. 3,061,377, patented October/1962 to The Dayton Steel Foundry Company, disclose positive drive concepts wherein driving lugs on the rims engage either clamping elements or wheel portions.

The improved torque transmission means provided by the present invention will maintain the advantages inherent in assuring lateral alignment and minimizing radial runout of the rims when mounted, while providing the additional advantages of assuring that the driving forces and braking forces, developed and applied during vehicle operation, will be transmitted effectively to each of the rims.

SUMMARY OF THE INVENTION

The object of the invention is to provide an improved dual rim, spacer and wheel assembly.

It is a further object of the invention to provide a dual rim, spacer and wheel assembly having components which will assure lateral alignment and minimize radial runout of the rims when mounted on the wheel, and will provide a positive driving connection between the inner rim-spacer-outer rim during operation.

It is a specific object of the invention to provide the improvements for the dual rim, spacer, and wheel assemblies disclosed in co-pending applications Ser. No. 252,412 and Ser. No. 252,413, both filed May 11, 1972.

These and other objects of the invention, and the advantages thereof, will be apparent in view of the Description of the various Embodiments as set forth below.

In general, a dual rim, spacer and wheel assembly according to the invention has clamping elements including a series of axially inner clamp means and a series of axially outer clamp lugs to cooperatively engage the mounting flanges of dual rims separated by the spacer. Each set of a clamp means and a clamp lug are supported by a fastening element extending axially through the wheel. The fastening elements carry fastening means which draw the clamp means and the clamp lugs together to seat the rim flanges. Torque transmission means are provided for a positive driving connection between the inner rim-spacer-outer rim mounted on the wheel by the clamping elements.

As disclosed herein, a torque transmitting means for an assembly according to the invention may have several forms. The torque transmitting means may include one or more driver elements straddling or extending axially over the spacer and having radially directed legs interfitting notches between the spacer and the opposed rim flanges. The legs may be maintained by various interference or resistance fits or by fastening elements inserted through the driver element into the wheel felloe. In another form, the driver element is inserted between the wheel spokes, behind the spacer and secured thereto by a fastening element. In still another form, the torque transmitting means may be rim flange lugs inserted in corresponding spacer notches.

DETAILED DESCRIPTION OF THE INVENTION

Figure 1:
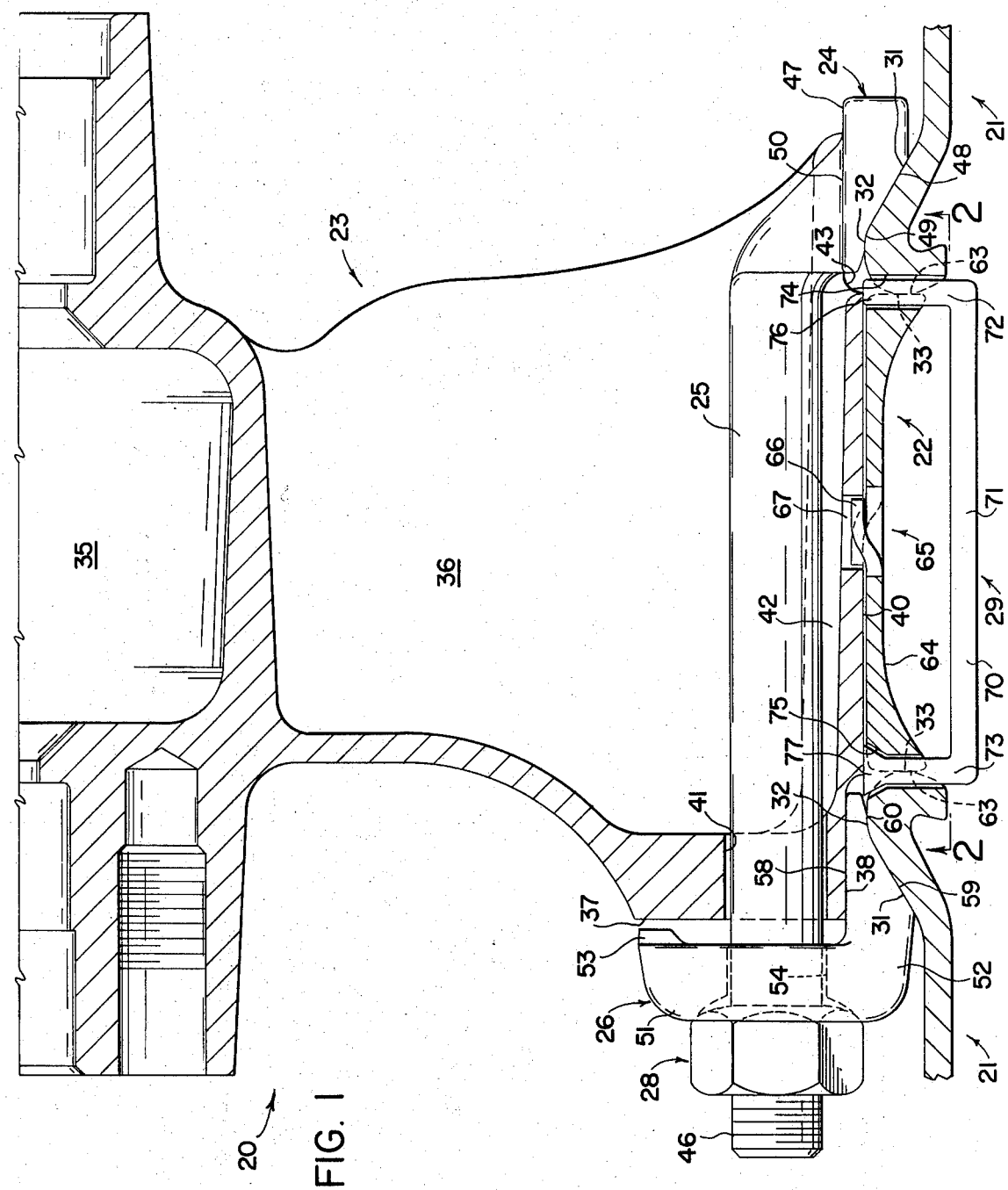
FIG. 1 is a fragmentary sectional view of a torque transmitting means according to the invention, in a dual rim, spacer and wheel assembly using clamping elements which are the subject matter of co-pending application Ser. No. 252,412, and a spacer which is the subject matter of co-pending application Ser. No. 252,413, both filed May 11, 1972.
Figure 8:
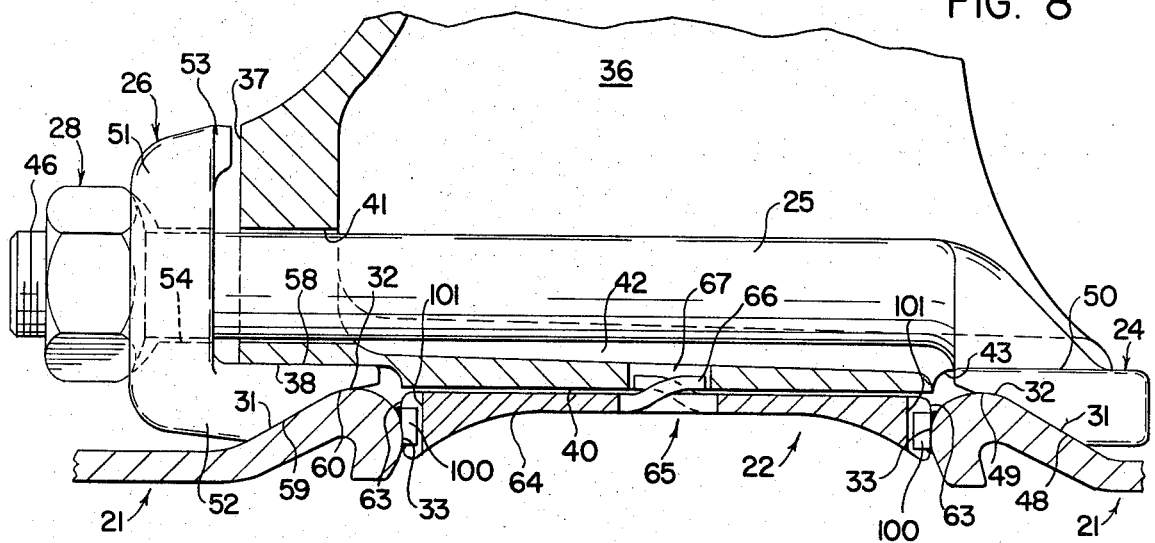
FIG. 8 is a fragmentary sectional view, similar to FIG. 1, of a torque transmitting means in the form of rim flange tabs inserted in corresponding spacer notches.

A dual rim, spacer and wheel assembly, using a torque transmitting means according to the invention, is referred to generally by the numeral 20. As shown in FIGS. 1 and 8, in an assembly 20 dual rims are mounted on the wheel by using the clamping elements which are the subject matter of co-pending application Ser. No. 252,412, filed May 11, 1972. The assembly 20 is characterized in that the clamping elements, rather than the wheel, per se, provide a felloe, felly or load-bearing surface for the rims. The spacer has a strengthened medial portion and a series of alignment means received in correspondingly dimensioned openings in the wheel felloe.

In an assembly 20, the dual inner and outer rims are referred to generally by the numeral 21. The spacer is referred to generally by the numeral 22. The wheel is referred to generally by the numeral 23. The rims 21 are seated against the spacer 22 by the cooperative action of clamping elements comprising an axially inner clamp means referred to generally by the numeral 24, a fastening element referred to generally by the numeral 25, an axially outer clamp lug referred to generally by the numeral 26 and a fastening means referred to generally by the numeral 28. The torque transmitting means are referred to generally by the numeral 29.

Each rim 21 may be a conventional flat base rim having a fixed bead flange and a removable bead flange (not shown). As shown, the mounting flange of a rim 21 has an axially inner holding surface 31, preferably inclined at an angle at 28° from the rotational axis of the rim. The holding surface 31 intersects and merges into a radially inner seating surface 32, preferably axially oriented substantially horizontal or parallel to the rotational axis of the rim. The seating surface 32 intersects and merges into an axially outer gutter or positioning surface 33, preferably radially oriented substantially vertical or perpendicular to the rotational axis of the rim. The rim mounting surfaces 31, 32 and 33 depict a conventional form of a mounting flange for rims which may be assembled on a wheel with the spacer, using a torque transmitting means according to the invention. The angularity of these surfaces could be varied somewhat in relation to the rotational axis of the rims while still utilizing the subject matter of the invention.

In the forms of the invention shown in FIGS. 1–6 and 8, the wheel 23 may be either a cast spoked wheel or a disc wheel, formed by stamping or forging. In the form of FIG. 7, the wheel 23 is a spoked wheel. As shown, the wheel 23 has a conventional hub area 35. When the wheel 23 is spoked, any desired number of spokes 36, preferably five or six, extend radially of the hub area 35.

The peripheral portion of each spoke 36 has a boss surface 37 radially oriented substantially vertically or perpendicular to the rotational axis of the wheel, an intersecting concave surface 38 axially oriented substantially horizontal or parallel to the rotational axis of the wheel, and a larger diameter axially extended medial surface 40 oriented substantially horizontal or parallel to the rotational axis of the wheel. The surface 38 seat the clamp legs 26. The surfaces 40 carry the spacer 22.

An axially oriented bore 41, for loosely receiving the shank of the fastening elements in the form of support bolts 25 for the clamp means 24 and clamp lugs 26, extends through the peripheral portion of a wheel 23 radially inwardly of the surface 38. The outer end of a bore 41 opens onto boss surface 37. The inner end of a bore 41 opens into an open area 42 radially inwardly of the medial surface 40.

As shown, the clamp means 24 may be provided by a series of individual elements which are positively positioned by sliding contact with sets of parallel surfaces 43 axially oriented substantially horizontal or parallel to the rotational axis of the wheel, on the radially outer side of the wheel peripheral structures defining the open area 42 and on opposite sides of a support bolt 25.

The clamp means 24 may be a series of one-piece solid elements. The bolt portion 25, threaded as at 46 for engagement with a fastening means 28 in the form of a nut, extends through a wheel bore 41 and parallel to the wheel surface 40 to join with a wedge portion 47. The radially outer face of a wedge portion 47 has a conical surface 48 and an intersecting axially oriented surface 49. A conical surface 48 matingly engages a correspondingly inclined inner rim flange mounting surface 31. An axially oriented surface 49 matingly engages an inner rim flange seating surface 32. The radially inner face of a wedge portion 47, on opposite sides of the juncture point with the bolt portion 25, has axially oriented surfaces 50 for slidingly engaging the surfaces 43 on the wheel when the fastening means are tightened.

While not shown in the drawings, the clamp means 24 could be made in the form of a full-circle or ring member carrying a series of support bolts for insertion through a series of wheel bores 41 and a series of intersecting rim flange engaging surfaces 48 and 49. This alternative form of a clamp means 24 could be utilized without departing from the subject matter of the invention.

A clamp lug 26 may be provided for each support bolt 25. A clamp lug 26 has a radially directed leg 51 and an axially directed leg 52 and the general shape of a conventional clamp lug, such as element 14 disclosed in U.S. Pat. No. 3,160,441, patented December/1964 to The Dayton Steel Foundry Company.

A clamp lug radial leg 51 is generally triangular in shape having an apex with a radially oriented stop surface 53. The stop surface 53 projects axially toward a wheel boss surface 37. A leg 51 also has an axially oriented bore 54 for receiving a support bolt 25. The bore 54 is centered so that a support bolt 25 will be axially oriented substantially horizontal or parallel to the rotational axis of the wheel when a clamp lug axial leg 52 is seated on a wheel surface 38.

A clamp lug axial leg 52 has an axially oriented convex surface 58 for sliding and seating engagement with a wheel surface 38. The radially outer face of the axial leg 52 has a conical surface 59 and an intersecting axially oriented surface 60. A conical surface 59 matingly engages a correspondingly inclined outer rim flange mounting surface 31. An axially oriented surface 60 matingly engages an outer rim flange seating surface 32.

A spacer 22 has radially oriented lateral edges 63 for seating against and between positioning surfaces 33 on the mounting flanges of the dual rims 21. The spacer 22 is strengthened by a generally concave medial portion 64 extending edge to edge. The radially inner face of the spacer 22 carries a series of alignment means indicated at 65. A spacer alignment means 65 may comprise a plurality of resilient projections 66 formed as by stamping the medial portion 64 of the spacer 22. The projections 66 are axially oriented in alternate directions so as to frictionally engage correspondingly dimensioned slots 67 in the felloe surface 40 of a wheel 23. Other alignment means could be provided for the spacer 22 when used in an assembly 20 according to the invention.

The torque transmitting means 29, in the forms of the invention illustrated in FIG. 1-6, may be a metal driver element 70, formed as by bending or stamping. A driver element 70 has a transverse medial portion 71 extending axially the width of a spacer 22 and terminating in radially inwardly directed dual legs 72 and 73. Each dual leg 72 and 73 is received within correspondingly dimensioned slots 74 and 75 formed in opposed and mating portions of the rims 21 and spacer 22.

Figure 2:
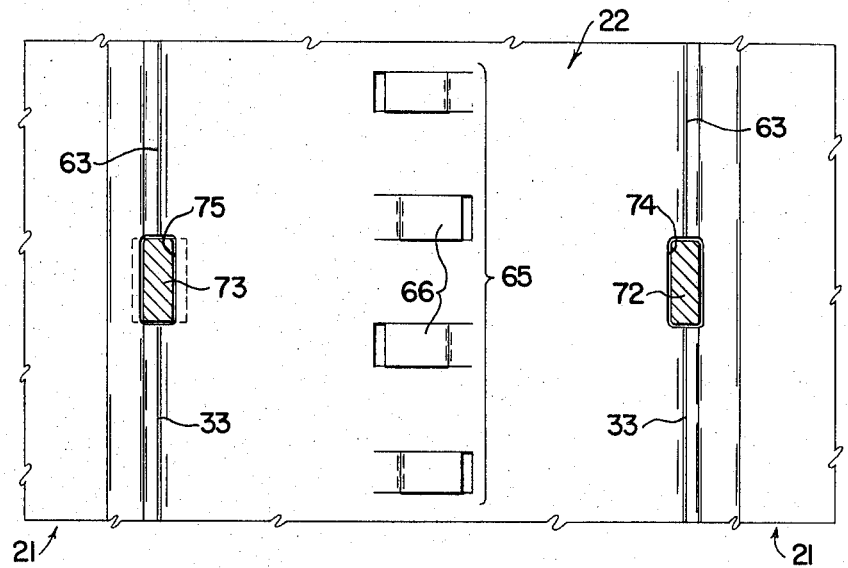
FIG. 2 is a plan view, taken substantially as indicated on line 2—2 of FIG. 1.

In the form of the invention shown in FIGS. 1 and 2, the driver element 70 has a flat sided axially inner leg 72 so that a surface 76 will seat on the wheel surface 40. In this form, the axially outer leg 73 terminates in a double hook flange 77 for seating on the wheel surface 40. The interference fit between the hook flange 77 and the correspondingly dimensioned notch 75 will retain the driver element 70 in position when the clamping elements are tightened.

Figure 3:
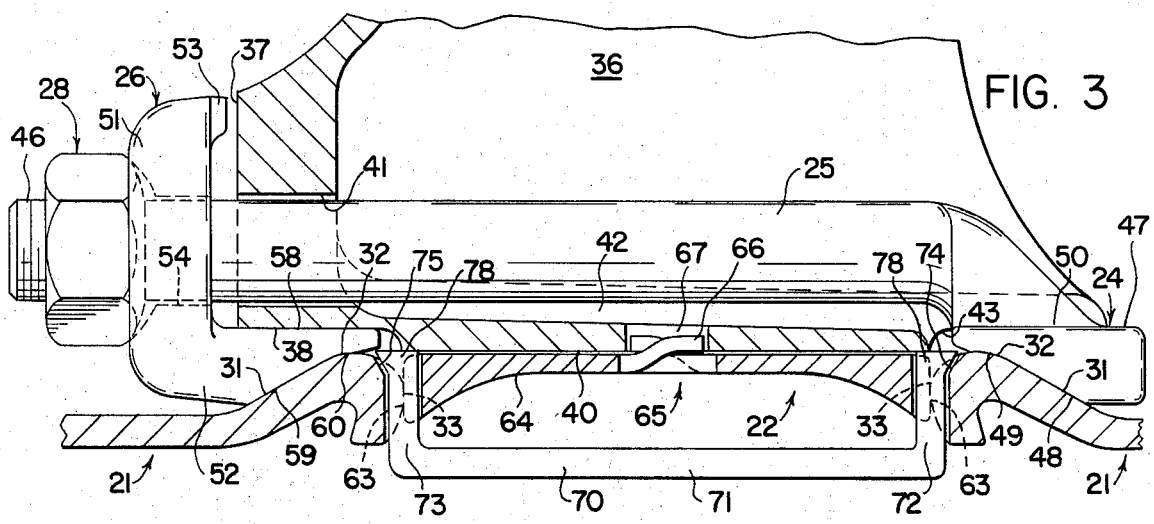
FIG. 3 is one of a series of fragmentary sectional views illustrating various torque transmitting means, specifically illustrating a driver element having axially outwardly directed hook flanges on both legs interfitting between the spacer and the rims.

In the form of the invention shown in FIG. 3, the dual legs 72 and 73 of the driver element 70 each have single axially outwardly directed hook flange portions 78 seating on the wheel surface 40 and retained by correspondingly dimensioned notches 74 and 75 when the clamping elements are tightened.

Figure 4:
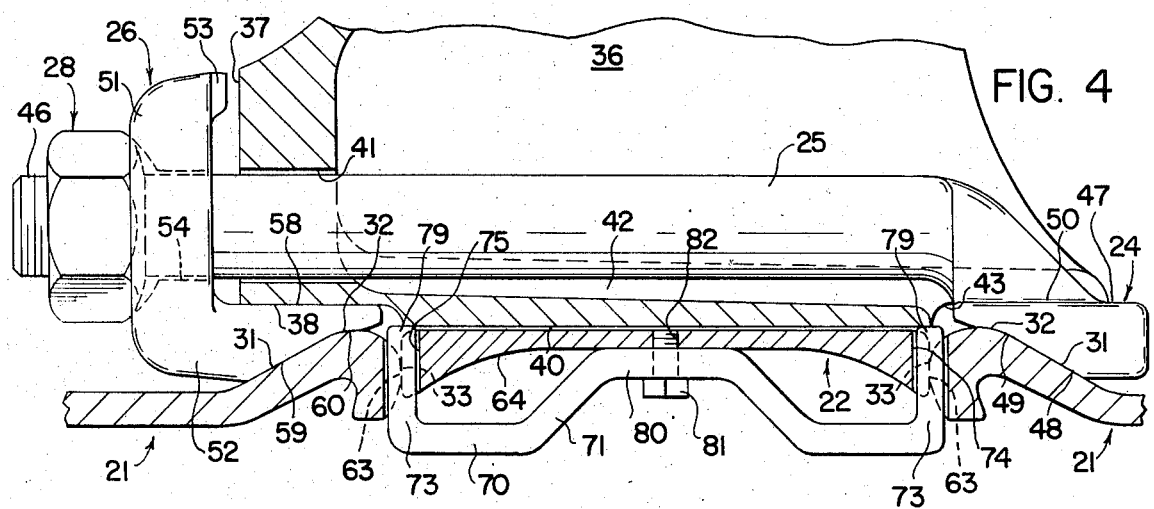
FIG. 4 is a similar view, illustrating a driver element secured by a fastening element to the wheel felloe.

In the form of the invention shown in FIG. 4, the dual legs 72 and 73 of the driver element 70 are flat sided so that surfaces 79 thereon will seat on the wheel surface 40. The medial portion 71 may be directed inwardly, as at 80, so that a fastening means 81 may be inserted, through the driver element 70 and the medial portion 64 of the spacer 22, into a counter bore 82 on the wheel surface 40. In this form, the fastening means 81 functions as the equivalent of the alignment means 65 illustrated in FIGS. 1-3, 5 and 6.

Figure 5:
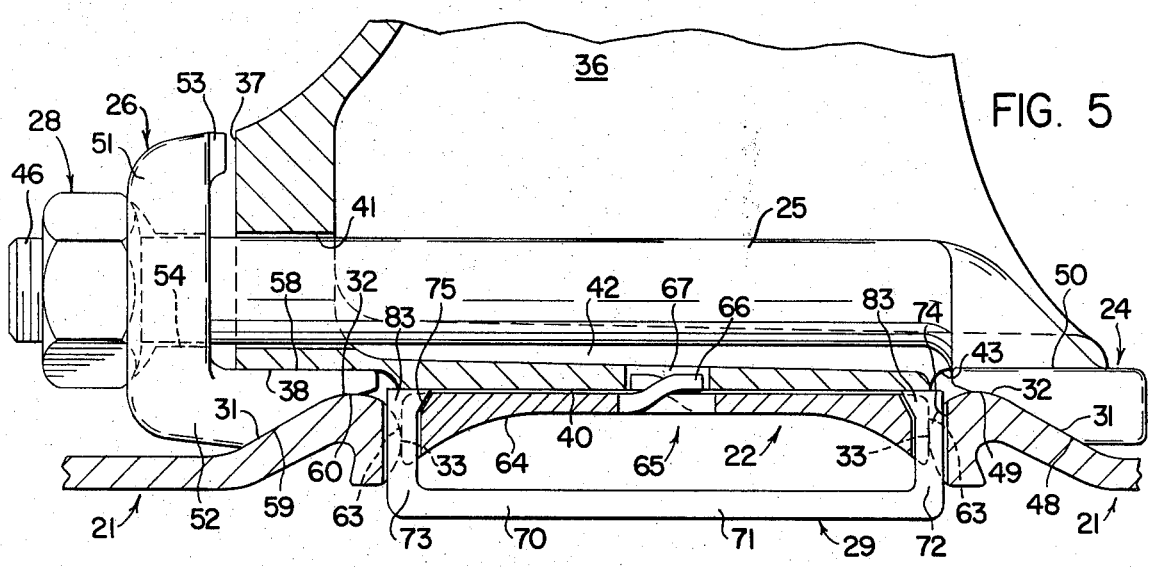
FIG. 5 is a similar view, illustrating a driver element having axially inwardly directed hook flanges on both legs interfitting between the spacer and the rims.

In the form of the invention shown in FIG. 5, the dual legs 72 and 73 of the driver element 70 each have single axially inwardly directed hook flange portions 83 seating on the wheel surface 40 and retained by correspondingly dimensioned notches 74 and 75 when the clamping elements are tightened.

Figure 6:
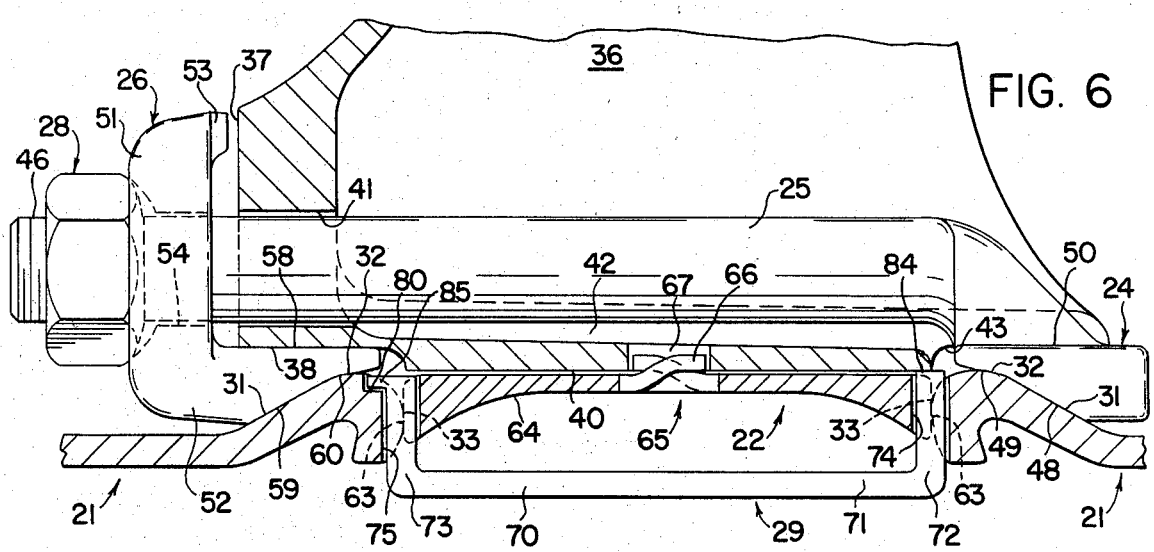
FIG. 6 is a similar view, illustrating a driver element with one leg received in a recess axially outwardly of the spacer.
Figure 7:
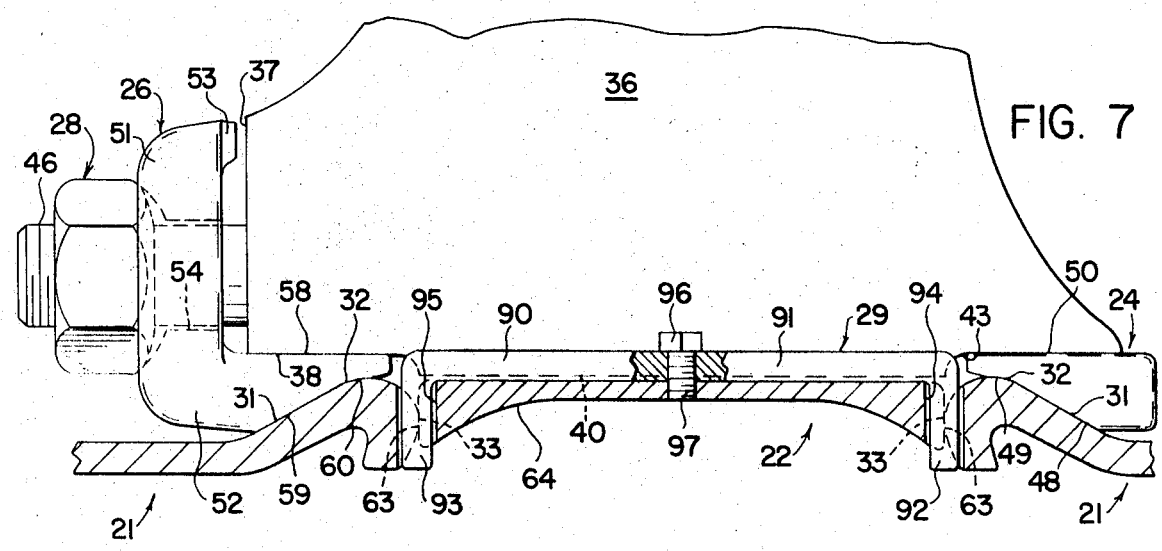
FIG. 7 is a similar view, illustrating a driver element inserted between wheel spokes, from the inner side of the spacer and secured by a fastening element.

In the form of the invention shown in FIG. 6, the driver element 70 has a flat sided axially inner leg 72 so that a surface 84 will seat on the wheel surface 40. In this form, the axially outer leg 73 terminates in a right angled portion 85 received in an axial extension 86 of the notch 75. The surfaces of the notch portion 75 and 86 will retain the drive element 70 in position when the clamping elements are tightened.

The torque transmitting means 29, in the form of the invention illustrated in FIG. 7, may be a metal driver element, formed as by stamping or bending. A driver element 90 has a transverse medial portion 91 extending axially the width of a spacer 22 and terminating in radially outwardly directed dual legs 92 and 93. Each dual leg 92 and 93 is received within correspondingly dimensioned slots 94 and 95 formed in opposed and mating portions of the rims 21 and spacer 22. The driver element 90 is installed between the spokes 36 of a wheel 23 by a fastening means 96 inserted through the medial portion 91 and into a counter bore 97 in the medial portion 64 of the spacer 22.

The torque transmitting means 29, in the form of the invention illustrated in FIG. 8, may be a pair of opposed axially directed driver lugs 100 attached, as by welding, to the rim flange gutter or positioning surfaces 33. The opposed driver lugs are inserted in correspondingly dimensioned slots 101 in the lateral edges 63 of the spacer 22 and retained in engagement therewith when the clamping elements are tightened.

What is claimed is:

1. A dual rim, spacer and wheel assembly including as clamping elements a series of axially inner clamp means and a series of axially outer clamp lugs to cooperatively engage the mounting flanges of inner and outer rims separated by said spacer, each set of clamp means and the clamp lug being supported by a fastening element extending axially through the wheel, each fastening element carrying a fastening means which when tightened will draw the clamp means and clamp lugs together to seat said rim mounting flanges, said assembly further having torque transmitting means providing a positive driving connection between the inner rim-spacer-outer rim mounted on the wheel by the clamping elements, said torque transmitting means including one or more driver elements having a medial portion extending axially of the spacer and having radially directed legs interfitting notches between said spacer and said rim mounting flanges.

2. A dual rim, spacer and wheel assembly according to claim 1, wherein said wheel is spoked and said driver element has a medial portion extending axially behind the spacer and has radially outwardly directed legs, said driver element being installed between said spokes by a fastening means inserted through the medial portion thereof and into the spacer.

3. A dual rim, spacer and wheel assembly according to claim 1, wherein said driver element has a medial portion extending axially over the spacer and has radially inwardly directed legs.

4. A dual rim, spacer and wheel assembly according to claim 3, wherein the axially inner leg of said driver element is flat sided and the axially outer leg of said driver element terminates in a double hook flange.

5. A dual rim, spacer and wheel assembly according to claim 3, wherein the legs of said driver element each have axially directed single hook flange portions.

6. A dual rim, spacer and wheel assembly according to claim 3, wherein the legs of said driver element are flat sided and a fastening means is inserted through the medial portion thereof and into the spacer.

7. A dual rim, spacer and wheel assembly according to claim 6, wherein said fastening means is inserted through said spacer and into said wheel.

8. A dual rim, spacer and wheel assembly according to claim 3, wherein the axially inner leg of said driver element is flat sided and the axially outer leg of said driver element terminates in a right angled portion received in an axial extension of the notch between said outer rim and spacer.

* * * * *